United States Patent [19]
Kikinis

[11] Patent Number: 6,167,120
[45] Date of Patent: Dec. 26, 2000

[54] APPARATUS AND METHODS FOR HOME NETWORKING

[75] Inventor: Dan Kikinis, Saratoga, Calif.

[73] Assignee: Lextron Systems, Inc., Saratoga, Calif.

[21] Appl. No.: 09/103,499

[22] Filed: Jun. 24, 1998

Related U.S. Application Data

[63] Continuation-in-part of application No. 08/811,648, Mar. 5, 1997, which is a continuation-in-part of application No. 08/744,287, Nov. 6, 1996.

[51] Int. Cl.$^7$ .................................................. H04M 11/00
[52] U.S. Cl. .................... 379/90.01; 709/224; 379/93.01
[58] Field of Search ................................ 379/419, 90.01, 379/201, 93.01; 709/224

[56] References Cited

U.S. PATENT DOCUMENTS

| | | | |
|---|---|---|---|
| 5,341,415 | 8/1994 | Baran | 379/201 |
| 5,864,607 | 1/1999 | Rosen et al. | 379/90.01 |
| 5,870,465 | 2/1999 | Hosbach et al. | 379/419 |
| 6,026,150 | 2/2000 | Frank et al. | 379/90.01 |

Primary Examiner—Zarni Maung
Assistant Examiner—Tak-Kam Lee
Attorney, Agent, or Firm—Donald R Boys; Central Coast Patent Agency

[57] ABSTRACT

A multimedia data distribution system comprises a distribution system adapted to distribute and deliver Asynchronous Transfer Mode signals to the level of an individual home network bus, a micro-PBX connected to the distribution system and to the home network bus; and a converter connected to the home network bus and having an outlet adapted for connecting to conventional single media and multimedia electronic devices, such as telephones, personal computers, fax machines, television sets, and the like. The micro-PBX is adapted to translate between the public network data protocol and a Local Area data protocol on the home network bus, and to manage the home network bus as a Carrier Sense Multiple Access/Collision Detect (CSMA/CD) type bus, and the converter is adapted to convert signals on the home network bus to a form required by one of the single media and multimedia electronic devices. In an alternative embodiment of the invention signals on the home network are provided as high-frequency, spread-spectrum signals.

1 Claim, 11 Drawing Sheets

Home System

*Fig.1 Home System*

| | |
|---|---|
| 210 | PC to PC |
| 211 | Repeated a hub chip 103 using NP0, NP1 and NP2 |
| 220 | PC to printer |
| 221 | Printer protocol NP1 is picked up by CPU 104 via 103 and 115 |
| 222 | sent to printer 132 via 102 and 115 |
| 223 | sent to printers 132 via 102 and 115, optionally buffering it in storage 105, 106 and 107 or any combination thereof |
| 230 | PC to Internet |
| 231 | TCP/IP (NP2) is picked up by CPU 104 |
| 232 | then processed into AU 101 |
| 233 | for transmissions to ISP equipment 120 via port 111 and communication network 110 |
| 240 | PC to ISP |
| 241 | TCP/IP (NP2) is picked up by CPU 104 |
| 242 | then processed into AU 101 |
| 243 | for transmissions to ISP equipment 120 via port 111 and communication network 110 |
| 244 | then going onto server 123 |

Figure 2 - Routing Examples

Features:

* Modular Design, based on PCI slots
* 2 sizes
    * 4 slots native
    * 8-16 slots with bridges
* embedded CPU
* FLASH O/S UNIX based
* auto attendant
* upgradable to FAX/VM server
* inserts for wireless LAN 2 Mb/s
* inserts for wireless PBX
* inserts for T1/E1
* inserts for Frame Relay/X.25
* inserts for X-MAS wired LAN @ 10Mb/s
* inserts for POTS
* inserts for ISDN
* inserts for ADSL
* optional UPS

*Fig. 11*

APPARATUS AND METHODS FOR HOME NETWORKING

CROSS-REFERENCE TO RELATED APPLICATIONS

The present application is a Continuation-in Part of application Ser. No. 08/811,648, filed Mar. 5, 1997, which is a Continuation-in Part of copending patent application Ser. No. 08/744,287, filed Nov. 6, 1996 and incorporates all of the prior application by reference.

FIELD OF THE INVENTION

The present invention is in the area of multimedia computing and communication systems, and pertains more particularly to networking with home systems to allow sharing of functions and devices among individual PCs connected to a home network.

BACKGROUND OF THE INVENTION

Continuing development of hardware and applications for home computing, coupled with explosive growth of the global network called the Internet has motivated more and more people to have at least one computer in the home or in a small business. For the purpose of description and teaching in the present application, the concept of a home environment is used. The inventor intends this concept to include any equivalent environment, such as a small business, non-profit organization, government organization, and the like, which might use systems of the sort taught herein. The references to home systems and home computers and the like are meant to include all such situations.

Many people in fact, have two or more computers at home, and many more are contemplating adding at least a second computer. A parallel trend is to adding one or more computerized appliances in addition to a home computer. These appliances are such as Internet Telephones, computerized set-top boxes, and the like.

A problem with more than one computer or network using-appliance, such as an Internet Telephone, WEB browsing set top box, etc. at home is that, just like in the office, a need quickly becomes apparent for connecting the computers in a network of some sort so resources like a printer and a modem may be shared. Still, even if a network were provided allowing sharing of common devices like a printer, allowing each computer to have Internet access is a problem. Given one Internet Service Provider (ISP) and one Internet account, even if several computers have simultaneous access to the Internet provider's server, only one user at a time may browse the Internet. There are traditional, but expensive solutions. Two or more Internet accounts could be maintained, for example, and each computer could have its own modem and dedicated telephone line. For a single family having multiple home computers however, this is not a good solution. Further, the lines in most standard analog home telephone systems are lacking somewhat in the ability to transmit certain types of data at a consistently high frequency. These types of telephone lines can suffer radiation leakage, etc.

Another difficulty with existing home network systems, is that proposed multimedia integrated systems in the current art depend typically on methods that are not compatible with existing home and office wiring. These systems often require that new compatible lines be installed that typically operate at a much higher frequency than can be carried successfully by conventional analog lines. As a result, such systems are expensive to implement and limited in operation. A system and apparatus is needed to enable real-time multimedia data distribution which is also capable of maintaining a high signal strength over existing telephone wiring of most homes and offices.

SUMMARY OF THE INVENTION

In a preferred embodiment a home server unit is provided comprising a communication bus for connecting digital devices within the home server interface unit; a CPU coupled to the bus for managing activities of the hone server unit; a random access memory (RAM) coupled to the bus for temporary and dynamic data and instruction storage; a read-only memory (ROM) coupled to the bus for non-volatile storage of an operating system; a hub circuit coupled to the bus and having network ports for connecting to personal computers; an input/output I/O interface circuit coupled to the bus and having at least one parallel port for connecting to printing and scanning devices; and a bridge adapter unit coupled to the bus and having at least one port adapted for connecting to a wide area network and at least one port adapted for connecting to a telephony device. The CPU, executing stored control routines manages data transfers between connected PCs and one or more service providers accessed via the wide-area network.

In alternative embodiments of the home server unit one or more of the hub circuit, the I/O interface circuit, and the bridge adapter unit are implemented as plug-in cards, and the bus has a card slot for receiving the one or more plug-in cards. Also in alternative embodiments of the home server unit the CPU, executing stored control routines, provides simultaneous Internet access for two or more PCs connected to the home server unit. Other functions provided by the home server through the CPU and stored control routines include telephone exchange services for two or more telephony devices connected to the home server unit, receiving incoming facsimile transmissions, and routing such transmissions to any one of connected PCs or connected printers, according to preprogrammed instructions, and providing access to a remote server over the port adapted for wide area network connection, so one or more connected PCs may use storage space on the remote server transparently to the user.

The home server unit according to embodiments of the invention solves the existing problem of providing wide area network access to multiple computerized appliances without requiring multiple service accounts.

In an alternative embodiment of the invention a multimedia data distribution system is provided, comprising a distribution system adapted to distribute and deliver Asynchronous Transfer Mode signals to the level of an individual home network bus; a micro-PBX connected to the distribution system and to the home network bus; and a converter connected to the home network bus and having an outlet adapted for connecting to conventional single media and multimedia electronic devices. The micro-PBX is adapted to translate between the ATM protocol and a non-ATM data protocol on the home network bus, and to manage the home network bus as a Carrier Sense Multiple Access/Collision Detect (CSMA/CD) type bus, and the converter is adapted to convert signals on the home network bus to a form required by one of the single media and multimedia electronic devices. The single media and multimedia electronic devices include telephones, personal computers (with adapter cards), fax machines, and televisions running through set top boxes. In this embodiment and aspect, multimedia distribution is accomplished an a relatively inexpensive manner, and by using existing telephone wiring available in most homes and businesses.

In yet another alternative embodiment of the invention a home networking system is provided, comprising conventional telephone wiring connected to telephone jacks in a customer's premises; and a customer demarcation unit at a customer's premise, having a port connected to outside telephone wiring and a port connected to the conventional telephone wiring in the customer's premise. In this embodiment the customer demarcation unit is adapted to receive signals on the outside telephone wiring, and to drive the conventional telephone wiring in the customer's premises as a local-area network (LAN) using a spread-spectrum high-frequency signal, converting the signals received to the protocol required by the LAN.

In still another embodiment a connection unit is provided at a connection point for a customer's device to receive signals on the LAN, wherein the connection unit comprises a sensor for sensing signal strength on the network; a microprocessor; a stored program executable by the microprocessor; a path from the LAN to a connection to a customer's device; and a delay line. The microprocessor, sensing a minimum signal strength threshold, is adapted to switch the delay line into the path to the customer's device, thereby improving signal strength to the customer's device.

DESCRIPTION OF THE PREFERRED EMBODIMENTS

Figure 1:
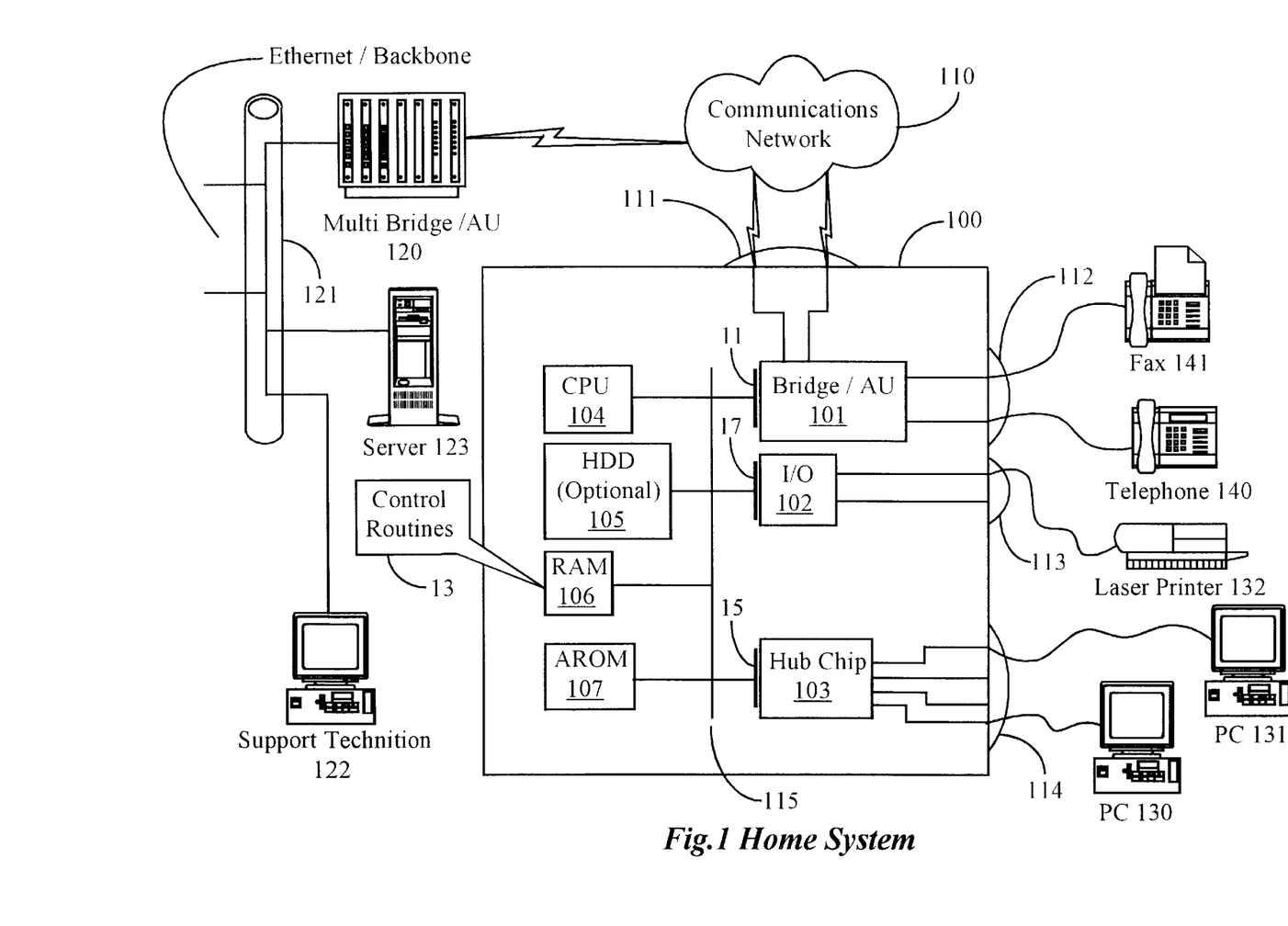
FIG. 1 is a block diagram of a home network according to an embodiment of the present invention.

FIG. 1 is a block diagram of a home network according to an embodiment of the present invention. A Home Server Unit 100 according to a preferred embodiment of the present invention comprises a CPU 104, an I/O circuit 102 (which may be a single chip), random access memory (RAM) 106, a read-only memory (ROM) 107, and a hub circuit 103. The ROM may in some embodiments be an alterable ROM (AROM) so upgrades in operating systems and the like may be made. There is also an optional hard disk drive 105. The digital elements of Home Sever Unit 100 are connected by a communications bus 115, which may be one or another of several buses known in the art, such as AT, PCI, and so forth. A plug-in interface 11 on bus 115, similar to or the same as an expansion port interface in a PC, is provided to accept one or another of several different bridge adapter units 101.

Home Server Unit 100 is typically a box that may be located in any convenient location in the home or other environment, with ports for interfacing to other units and services. For example, hub circuit 103 connects to multiple ports 114 for connection to multiple PCs. Four ports are shown and two are used in this example for connection to PCs 130 and 131. In the embodiment shown hub circuit 103 is also fashioned as a plug-in unit with a card slot 15 provided, so circuitry may be modularly adapted to a user's specific needs.

I/O circuitry 102 connects to at least one parallel port 113 for connecting to peripheral devices such as a printer 132 shown. Other peripherals, such as a second printer (color printer), a scanner, and the like may be connected from one of the I/O ports. Bridge Adapter Unit 101 provides circuitry with ports 111 for connecting to a communications network 110 and ports 112 for connecting to telephony equipment such as facsimile machine 141 and telephone 140. In some embodiments a large number of telephone ports may be provided, and Bridge Adapter Unit 101 may function as a PBX exchange.

Communications network 110 may be for example an ISDN connection to a local telephone company switch, in which case Bridge Adapter Unit 101 will be adapted for ISDN protocol. Communications network 110 may also be an analog telephone link, a cable connection, an Asymmetric Subscriber Digital Line (ASDL), or other link. The point of plug-in modularity for bridge adapter unit 101 is that a user may adapt his or her Home Server Unit 100 according to the service available from the home, and change at a later time if a new or different communication service to the home becomes available.

At the service provider's end a Multi-Bridge Adapter Unit 120 provides for receiving and processing data packets delivered over network 110, and for sending data packets from the service provider's end to the Home Server Unit, identified for the PC or peripheral device to which each transmission is intended. For example, facsimile messages may be delivered to unit 100 at Bridge Adapter Unit 101 via network 110, and be routed to facsimile machine 141. Alternatively, incoming faxes could be routed to laser printer 132 via I/O circuitry 102.

Returning again to the service provider's end of the system, Multi-Bridge Adapter Unit 120 connects to an Ethernet™ backbone 121 (in this particular embodiment) to which various equipment may be interfaced, such as a server 123 shown and a support technician workstation 122.

In a preferred embodiment of the invention control routines 13 are provided and stored in AROM 107 to be loaded into RAM 106 on start-up of the Home Server Unit. These routines provide for control of all elements connected to bus 115, and for conversion and routing of data among the various elements and ports. A salient advantage of the invention in this respect is that data protocols of any sort may be utilized and accommodated.

Figure 2:
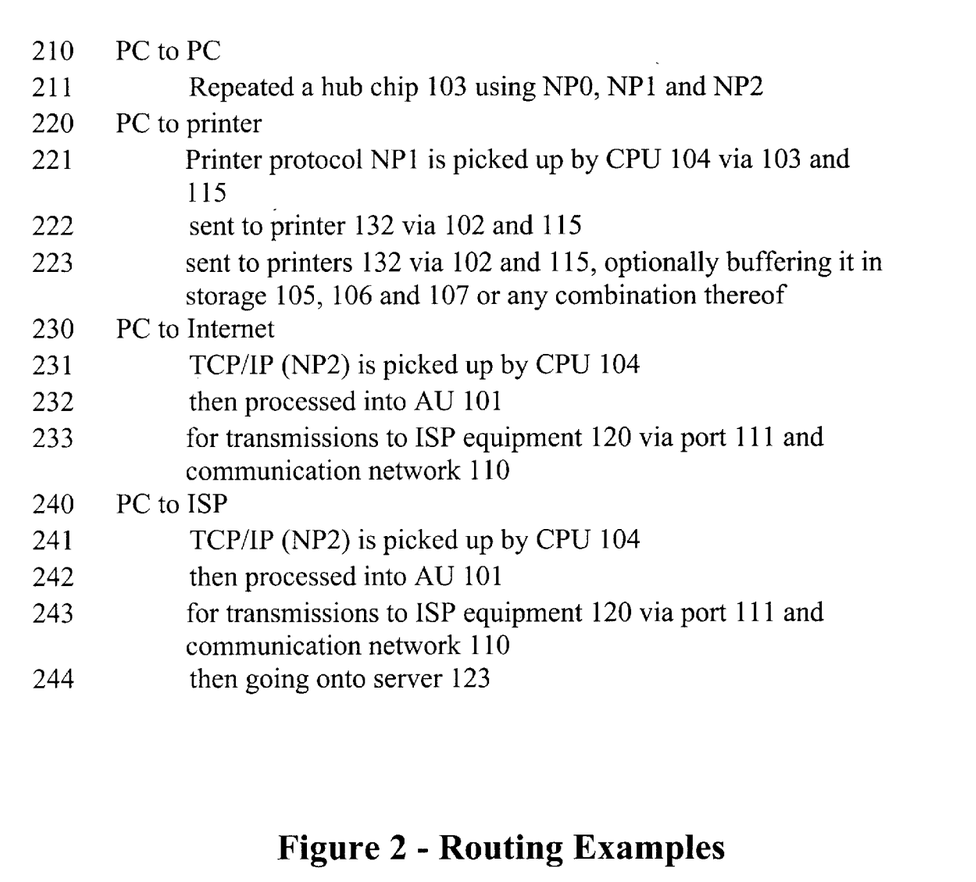
FIG. 2 is a line-by-line listing providing routing examples for the network system of FIG. 1.

FIG. 2 provides routing examples which may be accomplished by Home Server Unit 100. Data protocols (network protocols) that may be accommodated are represented in FIG. 2 by NP0), NP1, and NP2, NP0 may be, for example TCP/IP protocol, NP I Novell Network protocol., and NP2 MSNet. Lines 210 and 211 represent PC to PC communication through hub circuitry 103 (which may be a single chip). Data from PC 130, for example, may be received in NP0 and converted to NP1 for transmission to PC 131. The conversion would also be made in the reverse, and CPU 104, executing routines called from RAM 106, handles the conversion and routing. Different versions of control routines according to the invention may be available for loading to AROM 107, depending, among other things, on the network adapters and communication protocols of PCs to be connected.

Lines 220 through 223 in FIG. 2 represent PC to printer communication. Data for printer 132 received from either of PC 130 and 131 at hub 103 is converted as necessary by CPU 104 executing routines 13 and sent to printer 132 via I/O circuitry 102 and port 113. Printer data may be queued and buffered using any of the storage devices (RAM 106, optional hard disk drive 105, or even AROM 107), or any combination.

Lines 230 through 233 represent communication between PCs and the Internet. In this case TCP/IP protocol is received from one of the PCs and processed into AU 101 for transmission to ISP equipment AU 120. Return data, also TCP/IP, is sent from AU 120 via network 110 to AU 101, then routed to the associated PC by CPU 104 executing control routines 13.

Finally, lines 240 through 244 represent communication between a PC and the Internet service provider (ISP) by a different (non TCP) protocol.

In the embodiment shown PCs connected through Adapter Unit 100 to a service provider, depending on control routines provided, may have access to disk space, such as on server 123 connected to Ethernet backbone 121. This is an additional benefit providing a transparent extra high-capacity drive for each user.

Figure 3:
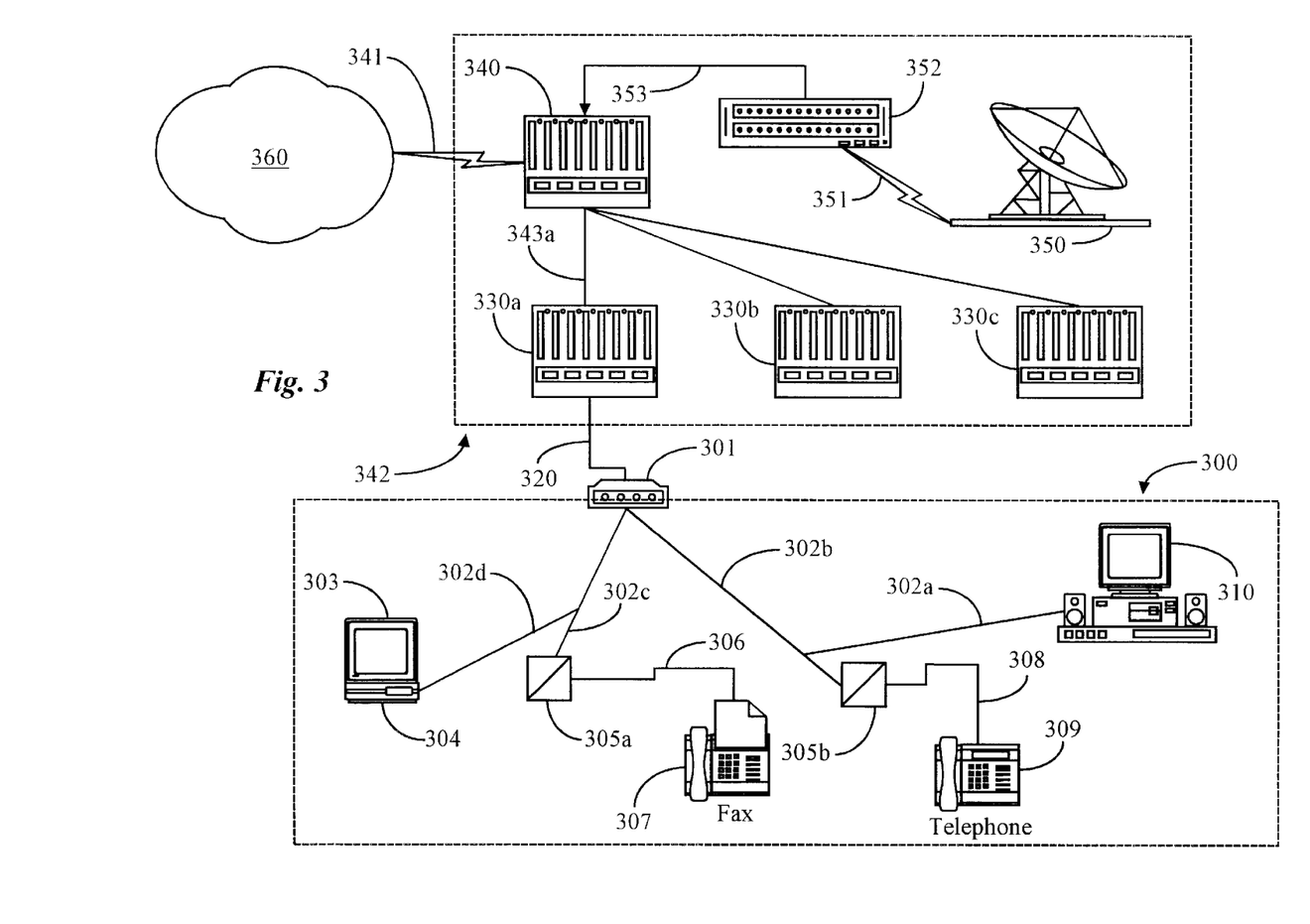
FIG. 3 is a block diagram of a multimedia network system according to an alternative embodiment of the present invention.

FIG. 3 is a block diagram of a multimedia network system in an alternative embodiment of the present invention. The system of FIG. 3 distributes multimedia realtime data, both on-demand and broadcast, as well as computer and telephony data, all over the same system, making use of existing telephone wiring in and to a home or office. This is done in an embodiment of the invention by adapting existing hardware elements and data protocols in a new and inventive architecture not before implemented, and in a manner to provide enhanced performance over existing and known proposed systems for multimedia distribution.

Typical existing networks for multimedia data distribution are of a sort called system parallel, which requires duplication of hardware and data paths, resulting in high cost. Some systems offering a form of integration require expensive new cabling. The system of the present invention avoids such duplication and allows use of existing telephone system wiring in virtually all cases, both in, and to the house.

In FIG. 3 network cloud 360 represents worldwide data sources, and link 341 is a high speed Asynchronous Transfer Mode (ATM) link operating on a high-speed path such as a fiber-optic line. ATM is not described in detail in this specification, as it is a well-known network protocol and system in the art of telephony, and available to the inventor as well as to all those with skill in the art.

Link 341 leads to a subdivision head-end 342 providing distribution to individual homes and businesses. One such individual unit destination is represented by unit 300, which may be a typical apartment, home, or office. The placement of such subdivision head-ends in embodiments of the invention is a function of distance capability for hardware and data protocols used.

An ATM router switch 340 in subdivision head-end 342 receives the ATM data packets from network 360 and distributes them to subsection routers 330*a* through 330*c* via internal wiring such as link 343*a*. It will be apparent to those with skill in the art that there may be many more (or fewer) than the three subsection routers shown, but three will be more than sufficient to teach the invention.

A satellite dish 350 is an optional component of subdivision head-end 342, and when present in embodiments of the invention is used to receive digitally-encoded satellite broadcasts. These signals are downloaded via link 351 to a converter 352, which de-multiplexes the transport strings and converts them into ATM packets which are provided over link 353 to ATM router switch 340 for distribution according to data in the ATM packets.

From subdivision head-end 342 data is distributed from each of multiple subsection routers to individual homes and businesses. It will apparent to those with skill in the art that there may be tens, hundreds or even thousands of links to individual destinations, but only one, link 320, is shown herein to adequately describe the present invention.

Link 320 is typically existing copper wiring and is based on the well-known Asynchronous Digital Subscriber Line (ADSL) technology. At the individual home or business 300 a micro-PBX 301 receives the ADSL signals, translates them, and retransmits them on internal wiring represented in FIG. 3 as links 302*a* through 302*d*.

In most existing home or office wiring the internal wires are copper, and not all connections are of the star-type, wherein each internal outlet has a separate wire from the receiving junction box. Rather the internal wiring may well be, and usually is, a tree-type network, wherein some outlets stem from other internal trunks lines. It is very common, in fact, for new outlets in home and office situations to be daisy-chained from existing wiring and outlets, rather than being taken from the initial junction box to the home or office. This existing situation is a formidable impediment to the kinds of integrating network solutions that have been so far proposed, which typically require separate lines to each outlet. In that circumstance, existing wiring has to be completely replaced at a substantial penalty in time and cost. In embodiments of the present invention, as described in more detail below, the existing wiring can stay in place and is used without impediment.

There are, as well-known in the art, a number of different requirements for data within a home or business, and several of these, though not all, are illustrated in FIG. 3. Shown in FIG. 3, for example, are a television 303 connected to a set-top box 304; a computer 310, a fax machine 307, and a telephone 309. There may, of course, be more than one of each of the devices shown, and other devices as well.

Existing internal wiring of unit 100 used in the illustrated embodiment of the present invention is illustrated as lines 302*a*–302*c*. For the purpose of illustrating the fact of tree-type architecture, lines 302*b* and 302*c* are shown as emanating from micro-PBX 301, while lines 302*a* and 302*d* proceed from lines 302*b* and 302*c* respectively.

In embodiments of the present invention micro-PBX is a converter and bus management system adapted to receive ATM data for all of the devices in the unit 100 to which the micro-PBX is connected, and to route the data in a different protocol onto the internal bus. Micro-PBX 301 operates the in-house wiring as a bus system under a multiple access points type protocol, such as Carrier Sense Multi Access/

Collision Detect (CSMA/CD) protocol. This is a protocol type well-known in the art that was also the basis of original Ethernet™ systems. In this system type, the sending device first listens on the bus for line free before sending data, then checks for collision. The inventor has selected this type bus management precisely because it allows use of the existing tree-type wiring structure of phone lines of most homes and businesses. However other implementations are also possible, such as modulated carriers etc. In micro-PBX 301 the ATM packets are converted to, in this case, TCP/IP protocol, although TCP/IP is not the only choice. Most local-area-network-type protocols could be used easily. Any type of high frequency modulation or direct digital connection could be used that is compatible with asymmetric star wiring (a.k.a. Christmas tree wiring). This also allows micro-PBX 301 to be added at almost any convenient point on the in-house bus.

Within unit 300 converters are provided for each device and outlet to convert the incoming TCP/IP data to the form required by each connected device. For example, television 303 is connected to micro-PBX through a set-top box 304 (which happens to be under the TV in this instance), and box 304 is adapted to receive video stream data addressed to a number assigned to the set-top box, and to translate that data stream to a video presentation playable on television 303.

In the case of fax machine 307, an adapter box 305a connects to in-house wiring 305a and converts incoming data on line 302c and addressed to the fax machine into an analog data stream on line 307 to the fax machine. Similarly a converter box 305b converts data on line 302b into an analog data stream on line 308 for voice communication via telephone 309. Conversion is, of course, bi-directional.

Conversion boxes 305a and 305b and like converter boxes in various embodiments of the present invention are adapted for mounting to existing telephone jack outlets presenting a new outlet for connecting to the specific device (fax, phone, etc.).

In the case of personal computer (PC) 310, conversion is accomplished in an expansion card compatible with any expansion slot in the computer, allowing the multimedia PC to be used both for telephony functions and as a WEB browser via the in-house bus.

In the embodiment of the invention illustrated with reference to FIG. 3, the Micro-PBX and converter boxes need power. Power may be supplied locally at each box by a power converter plugged into a power outlet (not shown). In a preferred embodiment, power is supplied at, for example, 48 volts across two lines of the in-house wiring. The power supply voltage is imposed by a transformer/converter box (not shown) that may be placed at any convenient telephone outlet jack outlet and connected to the power mains system available close by.

Another advantage of the illustrated system is that, as each adapter unit in the system, for each specific device, has an assigned number, calls may be placed between specific in-house devices via micro-PBX 301, which may accomplish many PBX functions. Another advantage is that, by placing a new converter box, new external access numbers may be assigned by a local telephone company remotely by reprogramming micro-PBX 301 on-line.

In embodiments of the present invention, once subdivision headers and subsection routers are available, conversion of any house, apartment, or small business unit is relatively simple. A micro-PBX is installed at the position of the existing telephone junction box where outside telephone service enters the premises (a.k.a. service demarcation). A power adapter is installed to provide the necessary power voltage on the in-house network, which is simply a matter of plugging in a power box at any convenient power outlet and connecting an outlet telephone jack into the house network at any convenient outlet port. Such a unit could also contain a back-up power source for case of power failure.

As a final step, PCs are supplied with expansion cards, TVs with compatible settop boxes, and converter boxes (see 305a and 305b above) are mounted to existing telephone jack outlets convenient to the equipment to be connected. The conversion is quick and simple, and may, in most cases, easily be performed by the end user with little outlay of time and material.

Method and Apparatus for Maintenance of High Frequency Communication over Existing Analog Lines In another embodiment of the present invention an innovative method and apparatus is provided to be wired into the home network system of FIG. 1 for the purpose of maximizing and maintaining a high quality data communication over existing analog home wiring whereby data can be transmitted and received at a higher frequency without typical analog problems affecting the system such as zero voltage phenomena and radiation leakage.

Figure 4:
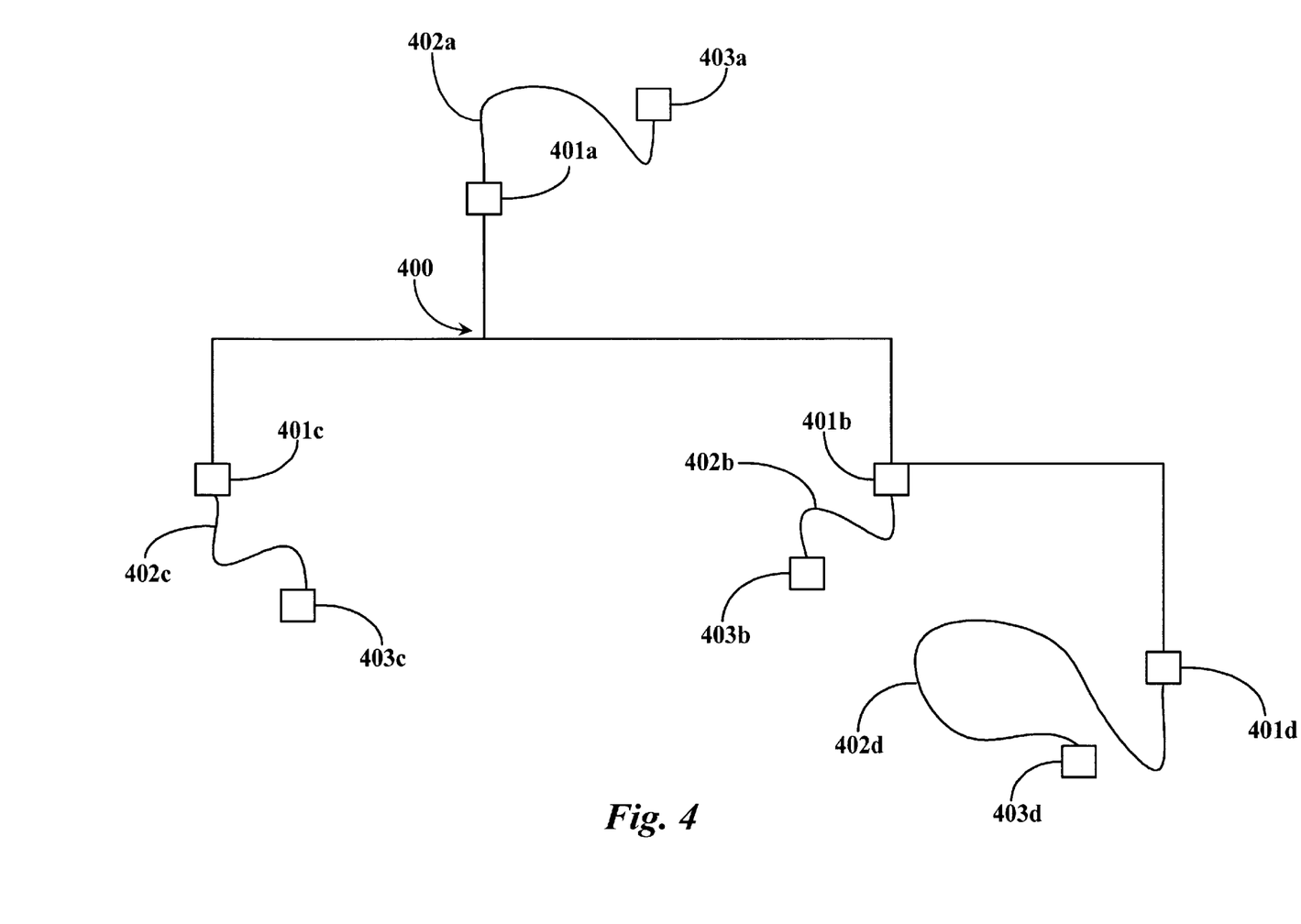
FIG. 4 is a simplified overview of x-mass tree wiring of a home network system in an embodiment of the present invention.

FIG. 4 is an overview of "x-mas tree wiring" (typical home telephone wiring is "organically grown") as it might appear in a home set up to operate as a network according to an embodiment of the present invention whereby a Customer Demarcation Point (CDP) 401a is connected to network wiring 400 leading into the home. Network wiring 400 consists of lines that connect to telephone jacks inside the home and will hereafter be referred to line by line. A CDP, as is known in the art, is the point in the wiring (typically, a utility box outside of the home) where the responsibility of the phone company ends and the responsibility of the customer begins. In this embodiment, there are two lines 400 branching off of the main line coming from CDP 401a. A first line (400) is connected to a telephone jack 401c inside the home. A second line (400) is connected to a telephone jack 401b which is in turn connected by a line (400) to a telephone jack 401d. It will be apparent to one with skill in the art that there are limitless configurations possible with regards to home network wiring as described above. For example, there may be more than two lines 400 branching off from CDP 401a, there may be more three telephone jacks such as telephone jack 401b connected to network wiring 400, or there may be more than one CDP such as CDP 401a as might be the case for the subscription to multiple phone companies and so on. The instant embodiment shown in FIG. 4 is meant to illustrate a typical situation and is deemed sufficient by the inventor to adequately illustrate the present invention.

Connected devices used in conjunction with the home network in accordance to an embodiment of the present invention may include such devices as a PC, fax machine, home based server, converter box for Internet (digital) TV and so on. These connected devices, present in previous embodiments, are represented in this instant embodiment by elements 403a–d. Similarly, the cabling and or wiring used to connect those devices is represented by elements 402a–d. In this instant embodiment, connected device 403a is connected via cable 402a directly to CDP 401a bypassing a telephone jack such as telephone jack 401b. In this case, connected device 403a may be of the form of an outside unit such as a satellite sender/receiver. It is intended by the inventor that hardware, converter boxes, and other elements of the present invention such as micro PBX 100 represented in the embodiments of FIGS. 1 and 3 also be applicable to this instant embodiment of the present invention. However, for the purpose clarity, many previous elements already described will not be reintroduced in this additional embodiment illustrated by FIG. 4 and by FIGS. to follow.

Figure 5:
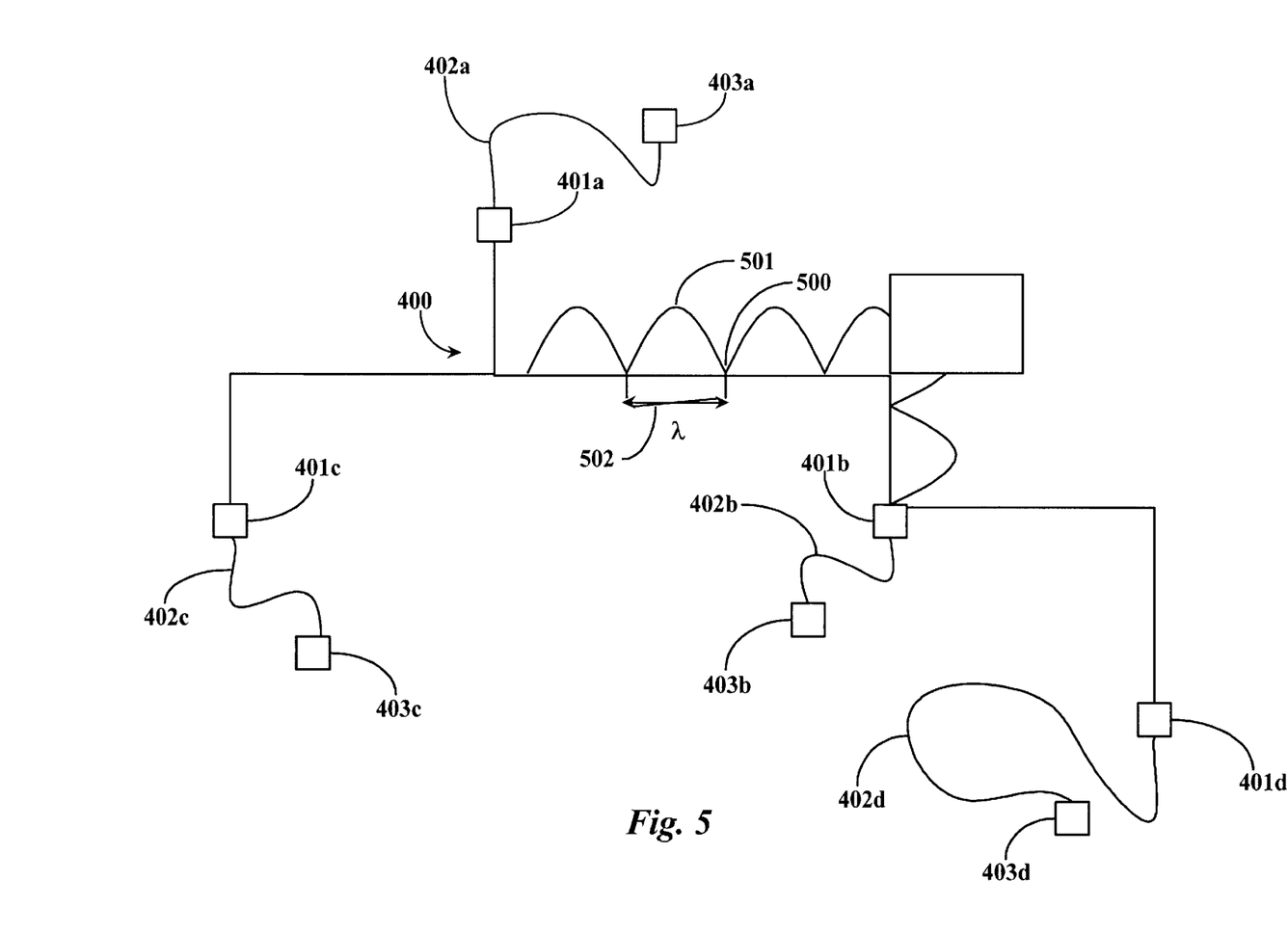
FIG. 5 is an illustrative view of high frequency waves carried on the wiring of FIG. 4.

FIG. 5 is an overview of the network wiring of FIG. 4 illustrating the effect of applying a high frequency communication to the network system whereby a standing wave 501 is carried over network line 400. It is deemed appropriate by the inventor that the level of frequency utilized for the purpose of adequate signal strength for connected devices be from a 900 MHz. Band. However it will be apparent to one with skill in the art that a differing frequency could be utilized.

Applying frequencies such as 900 MHz to a typical (conventional) network comprising analog-type lines results in a reflection of the original wave coming back across the line. This backward reflection creates specific areas or locations whereby no usable signal is present due to a signal cancellation caused by the overlap. These zero-voltage signal locations are known in the art and are sometimes referred to as "black holes". In the instant embodiment a "black hole" 500 is present along incremented points throughout network line 400 where wave 501 is present. At a frequency of 900 MHz. the distance between "black holes" 500 across network line 400 is approximately 30 centimeters (about one foot). This distance is represented in this embodiment by lambda 502 (wavelength of the signal). Conventional termination impedance-matching set-ups used commonly in analog lines cause a relative stability of the "black hole" phenomena by virtue of their fixed locations in the line. For example, if a receiver of wave signal 501 is close to "black hole" location 500 at the termination point of the signal then the receiver will pick up a percentage of that signal strength related to its closeness to that particular "black hole" location. Therefore, the receiver may pick up zero % of the signal strength if wave 501 terminates at the lambda end point (black hole), or perhaps 50% of the signal if wave 501 terminates at a point half way up it's curve and so on.

It is well known in the art that standing waves of the type that are transmitted in a fashion as described above may vary somewhat in frequency and actual formation. Depending on the frequency used for the transmission, and on other variables such as line quality and oscillation factors, standing wave forms may vary slightly in actual form from transmission to transmission and therefore cannot be distributed with perfect uniformity over a specific length of wire so as to allow an imagined point on the wave form to coincide with a set distance point in the wire in a continually repeated fashion. Hence, a system that utilizes a fixed receiver or receivers in the line will be unreliable in delivering a high frequency signal strength that can be constantly maintained at a desired level for all connected devices. It is the intention of the inventor to introduce a unique signal receiving method whereby the level of reception of a typical standing wave sent at a frequency of 900 MHz. can be maintained at approximately 86% of full signal strength over a typical analog telephone line. More detail about this unique signal receiving technique in accordance to with an embodiment of the present invention is provided in description and FIGS. below.

Figure 6:
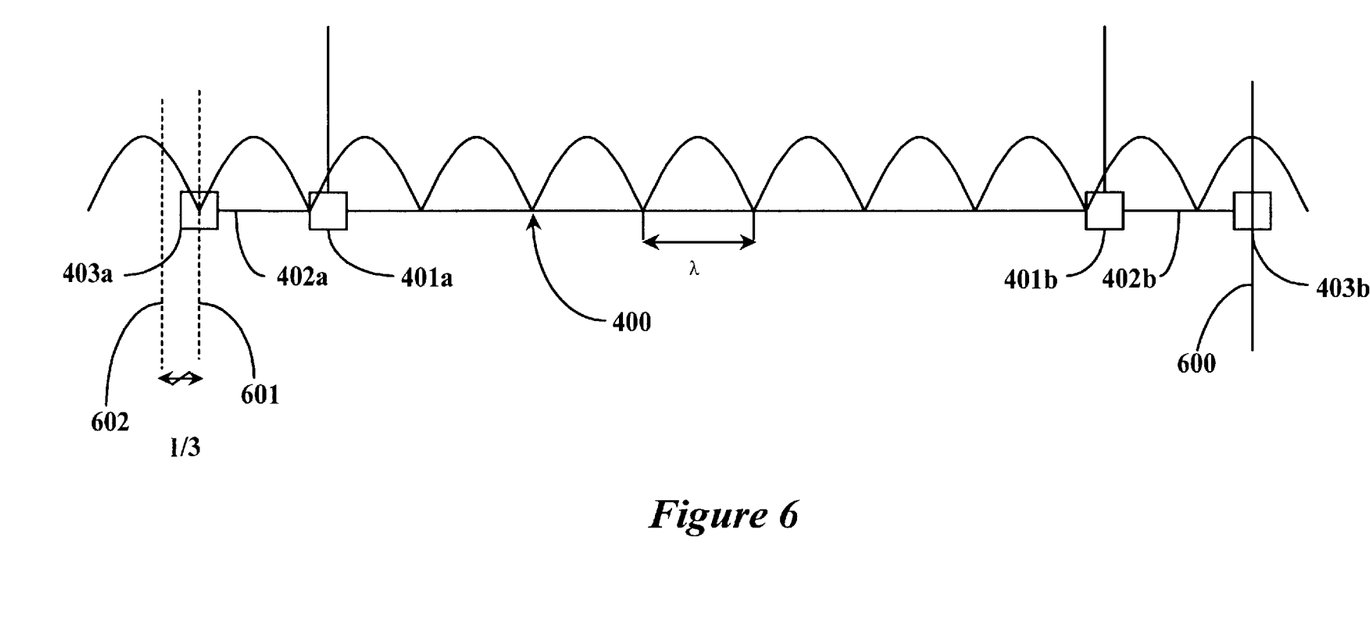
FIG. 6 is a diagrammatic view of a zero voltage phenomena occurring on the wiring of FIG. 4.

FIG. 6 is a diagrammatic view further illustrating the effect of "black hole" phenomena in a system with fixed receivers whereby data is being transmitted over network line 400 in a typical standing wave form. As the standing wave terminates at connected device 403b, a fixed receiver happens to be positioned at a receiving point 600 so as to receive a full percentage of signal strength. However, a second connected device 403a has a receiver positioned at a receiving point 601 and is not picking up any usable signal because in this particular transmission, it coincides with a "black hole" such as "black hole" 500 of FIG. 5. While standing wave forms are not uniform, and may vary in actual form as described above with reference to FIG. 5, the stability of a series of waves produced by a same source transmission at a same frequency rate is sufficient to cause problems where a receiver happens to be positioned at a repeat location of a "black hole" such as is the case at receiving location 600. If the receiver were moved about ⅓ of lambda to a receiving location point 602 then the signal strength would be approximately 86% which would be sufficient to operate connected device 403a.

Figure 7:
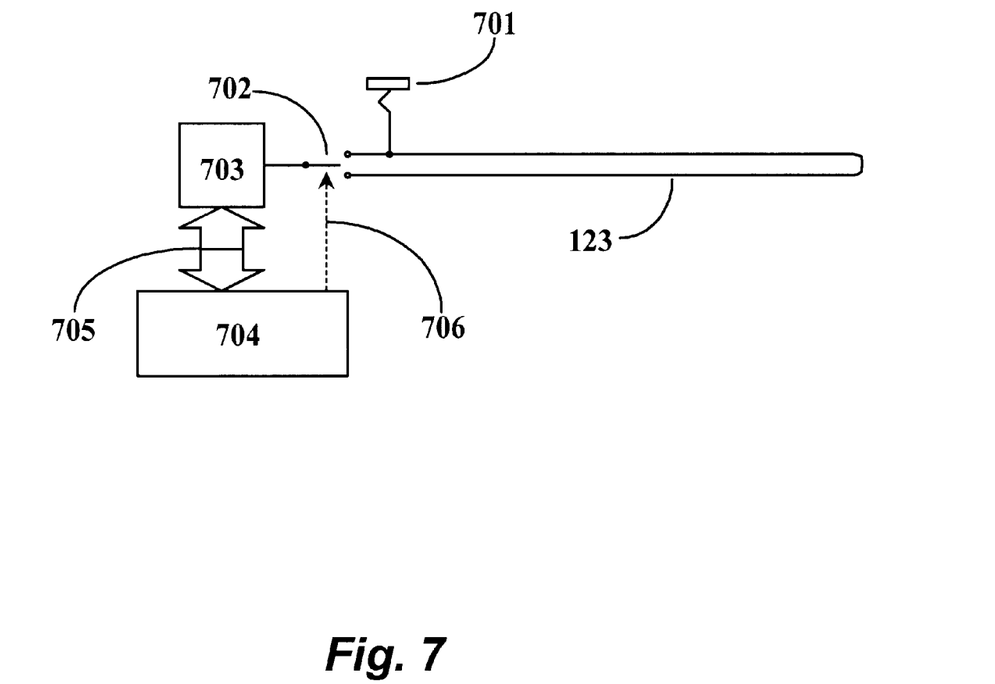
FIG. 7 is a diagrammatic view of a method for eliminating the zero voltage phenomena of FIG. 6 in an embodiment of the present invention.

FIG. 7 is a diagrammatic view illustrating a method whereby a receiver can be moved away from "black hole" locations such as "black hole" 500 of FIG. 5. Element 701 represents a connector that is located at the back of a typical receiving board engaged in receiving a signal. Element 702 is a selector which has a choice of selecting connector input direct (sending the signal directly to the board) or connector input delay (sending the signal through delay line 723). Delay line 723 has a length equal to ⅓ of lambda 502 of FIG. 5 (about 4 inches @900 MHz). A controller device 704 is connected to a physical layer adapter, a transceiver, 703. Controller 704 can detect the rate of error associated with the signal form. For example, if the wave begins to move its position so that a "black hole" condition becomes imminent, controller 704 will foresee the activity and can activate switch 706 to connector input delay position at a predetermined signal strength. Once delay line 723 is activated, the receiver picks up the delayed signal at approximately 86% of full signal strength instead of a lower % associated with a closer proximity to the "black hole". In principal the receiver in this embodiment, thus enabled, has "soft-moved" ⅓ of lambda (approximately 4 inches with a signal of 900 MHz.). In a preferred embodiment of the present invention enhanced soft-movable receivers such as the one described above will be placed in the same locations with respect to their associated connected devices as conventional fixed receivers would be. Also each soft-movable receiver must operate independently from other receivers on the system as connected devices will typically vary as to location (distance from signal source) on the system. As well, dual soft-movable receivers may be incorporated and used in association with one connected device as might be the case where a protocol converter box such as described with reference to earlier embodiments is wired in the line some distance away from the connected device. It will be apparent to one with skill in the art that there are many configurations possible with regards to installing soft-movable receivers on the home network system of FIG. 1 without departing from the spirit and scope of the present invention. Such as examples already provided.

Figure 8:
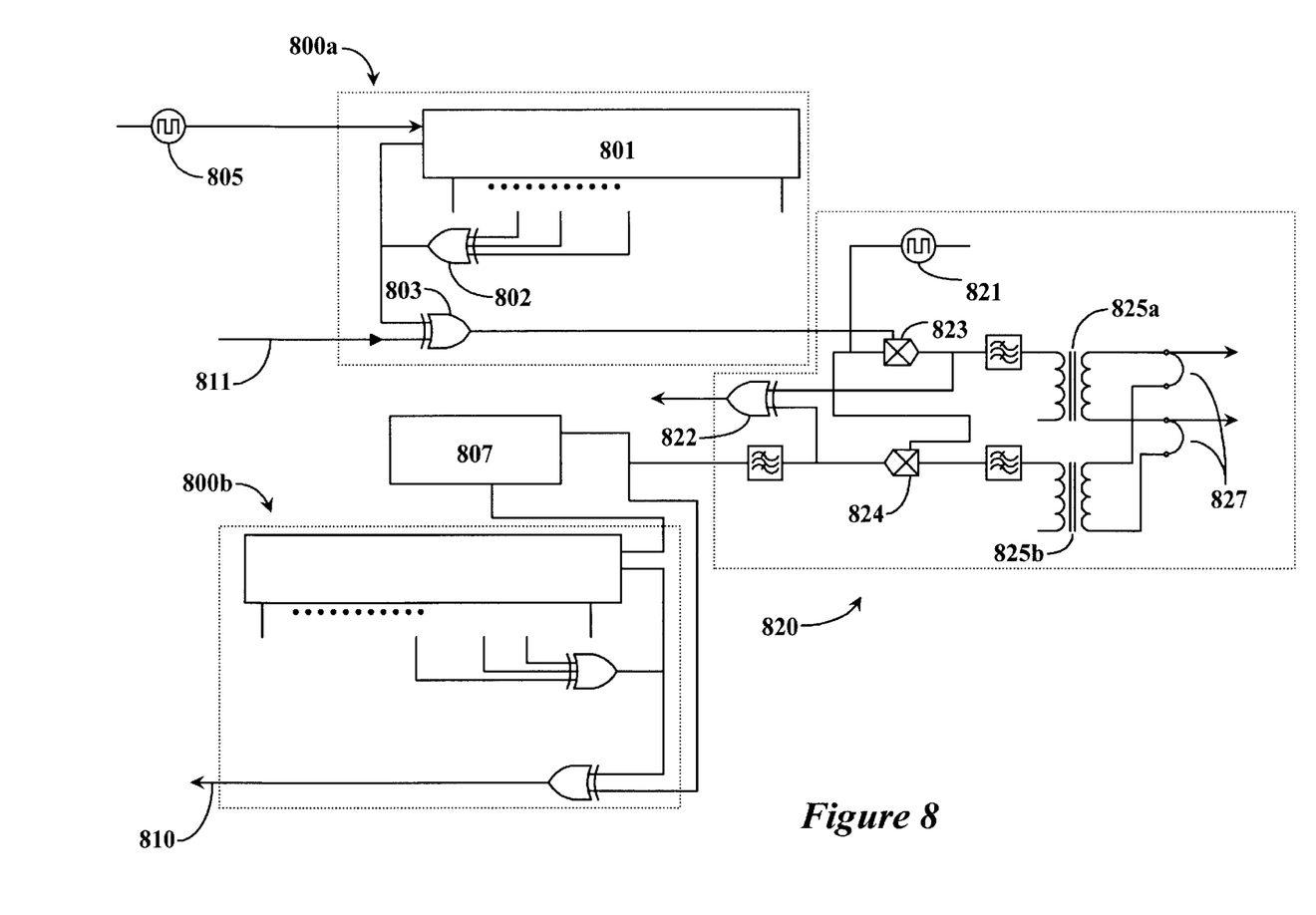
FIG. 8 is a block diagram of the internal components of a spread-spectrum modulator-demodulator in accordance with an embodiment of the present invention.

FIG. 8 is a detailed block diagram illustrating a spreader/despreader device as is used in accordance with an embodiment of the present invention for the purpose of converting a wave form into a broad band signal. This is known in the art as a spread-spectrum modulator/demodulator. To further illustrate, element 805 produces a spreader clock at 100 MHz. for input data 811 arriving at 10 MHz. This means that the resulting broad band signal will have a spread of 100 MHz. Box 800a contains a spreader while box 800b contains a virtually identical de-spreader. In principal and as is well known in the art, spreaders and de-spreaders are nothing more than random number generators that generate numbers at a specific spread frequency. Numbers generated by spreader 800a are used to scramble the input signal through gate 803 from where the resulting scrambled data proceeds into modulator 823 where the carrier signal being transmitted at 900 MHz. is phase modulated. From there the signal proceeds into a filter adapter 825a and then is coupled into the wiring. Via junction taps 827, the signal is then passed through adapter 825b and into demodulator 824 from which the data signal emerges still scrambled. It will be apparent to one with skill in the art of electronic communication that terms used here such as spreader/de-spreader, phase modulator, filter adapters and so forth are well known in the art and are common signal filtering components. Therefore, much definition as to the dedicated function of each component is not described. An X-OR-gate 822 is used in this instant embodiment for the purpose of detecting collisions which are then fed into a Sears and Mason B controller driver as CD (collision detect) signals. Box 820 in this instant embodiment represents the modem port 703 of FIG. 7. Element 807 is a phase lock device that locks on to the phase of the out-coming signal and regenerates the 100 MHz. spread clock. From there the signal passes into de-spreader 800b and passes as un-spread data represented by element number 810.

Figure 9:
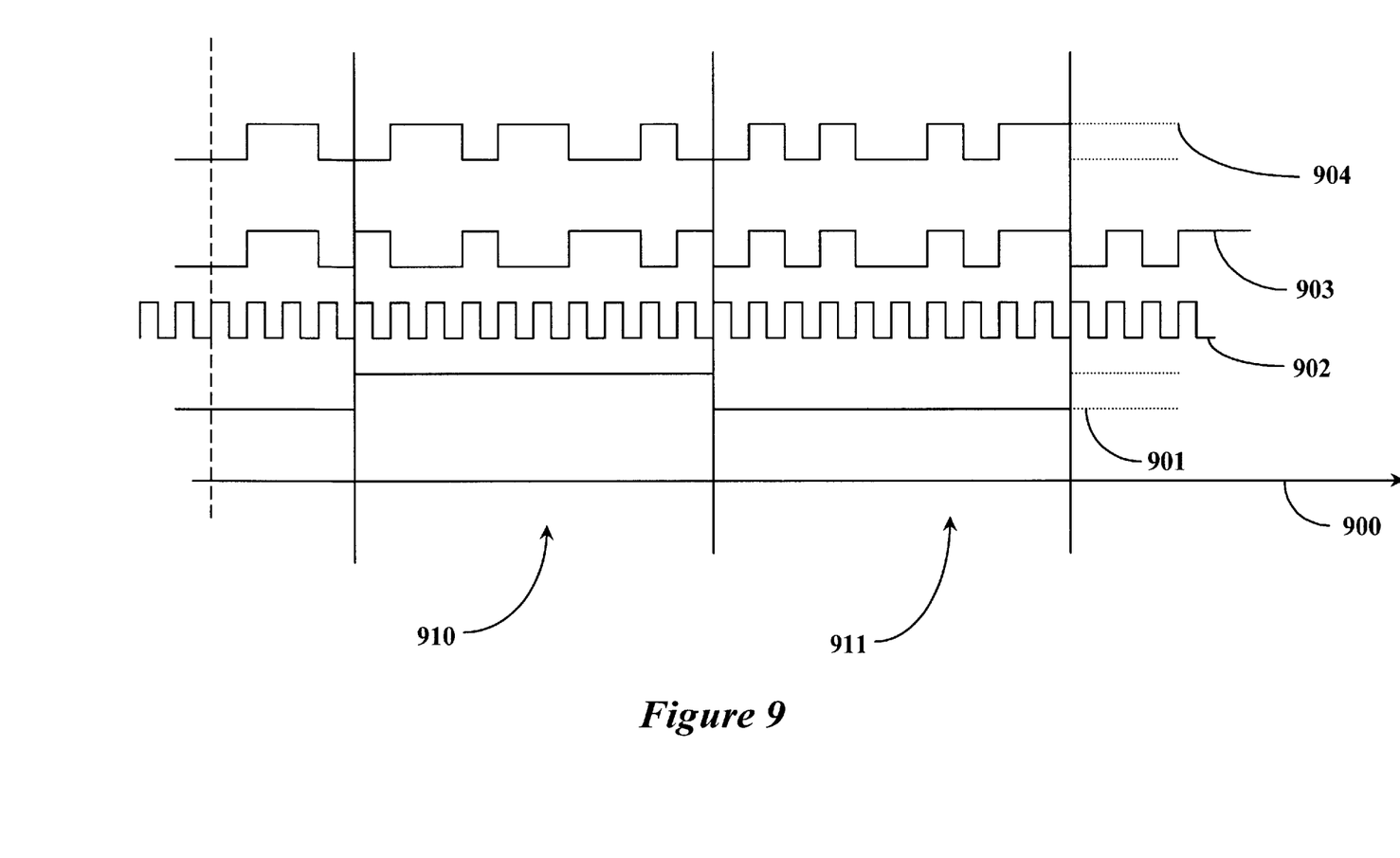
FIG. 9 is a time chart illustrating spread data and time relationship in an embodiment of the present invention.

FIG. 9 is a time chart illustrating the activity produced by the spreader/de-spreader of FIG. 8 wherein a logical one of input data signal is present in time slot 910 and another logical one of data signal 901 is seen in time slot 911. A spreader clock signal 902 (signal emanating from spreader clock 805 of FIG. 8) is applied to input data signal 901. Element 903 is the spreader signal emanating from gate 802 of FIG. 8 and element 904 is a combination of the spreader signal and the data signal emanating from gate 803 of FIG. 8. As can be seen in this instant embodiment, spreader signal 903 is inverted in time slot 910 while it is not inverted in time slot 911. It will be apparent to one with skill in the art that a time chart associated with a signal filtering operation such as the one described above is normally viewed and analyzed by an expert in the field therefore the inventor has chosen not to go into much detail regarding various activities and so on that can be represented by such a time chart except to provide a basic description of the activity depicted here.

Figure 10:
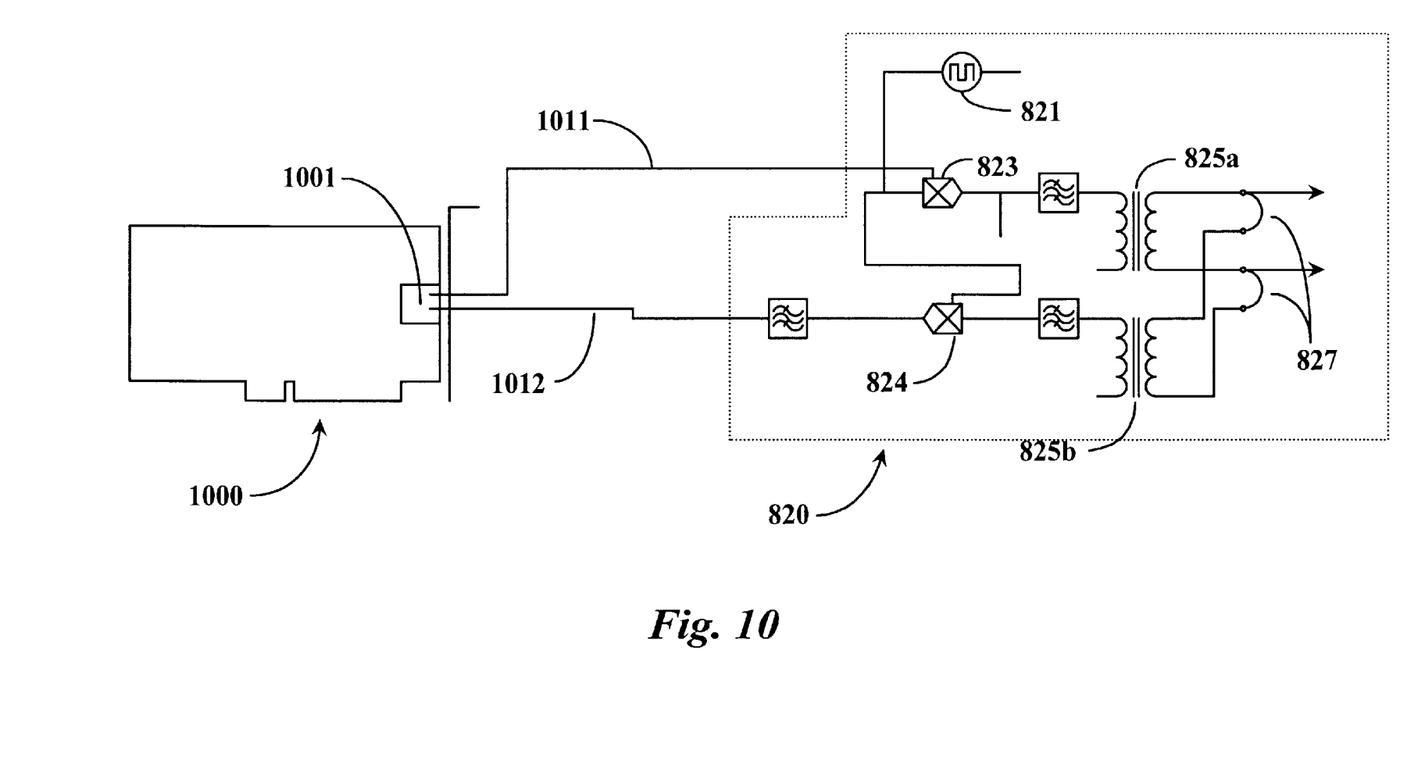
FIG. 10 is a diagrammatic view of an alternate embodiment where network cards are used.

FIG. 10 is a diagrammatic view of an alternate embodiment whereby signal spreading and de-spreading is performed in the CPU by help of a software executed by the CPU, of a connected device on the home network system. Wherein a network card (not shown) could be provided for connection to a connected device such as a PC on the home network. This network card is made to transmit the data signal at 100 MHz so that the spreader/de-spreader function illustrated in the Embodiment of FIG. 8 can be eliminated. Rather, this function will now be performed in the CPU of a connected device as described above, and to be described in the following text. A 100 MHz based T-adapter 1000 is provided to transmit the data from a 100 MHz based network card to a PCI bus connector represented by input 1011 and output 1012 into a CPU. Inside the CPU spreader/de-spreader calculations are performed and the resulting data is reduced by approximately ⅛ of the actual transmitted bits of the original input data. Processed data proceeds from the CPU to an output connector 1001 from where data lines are run to a small tuner box containing the necessary components for modulation and demodulation such as are represented in the previous embodiment of FIG. 8. In this embodiment connected devices performing dedicated functions can be easily and inexpensively adapted so as to contain a 100 MHz micro-controller and the necessary tuner components in one small box linked to the CPU and the network cord as described above. The stated goal of an approach such as the one described directly above is to further flatten the spectrum of the signal significantly reducing possible radiation leakage. In this instant embodiment, collision detection is also performed in the CPU and connected cards are assigned addresses which are used by the CPU to tell whether a particular card has to "listen" for a signal or not. It will be apparent to one with skill in the art that there are many ways network cards may be utilized and implemented in a home network system without departing from the spirit and scope of the present invention such as using different frequencies, using different connections for different types of communication and so on.

Figure 11:
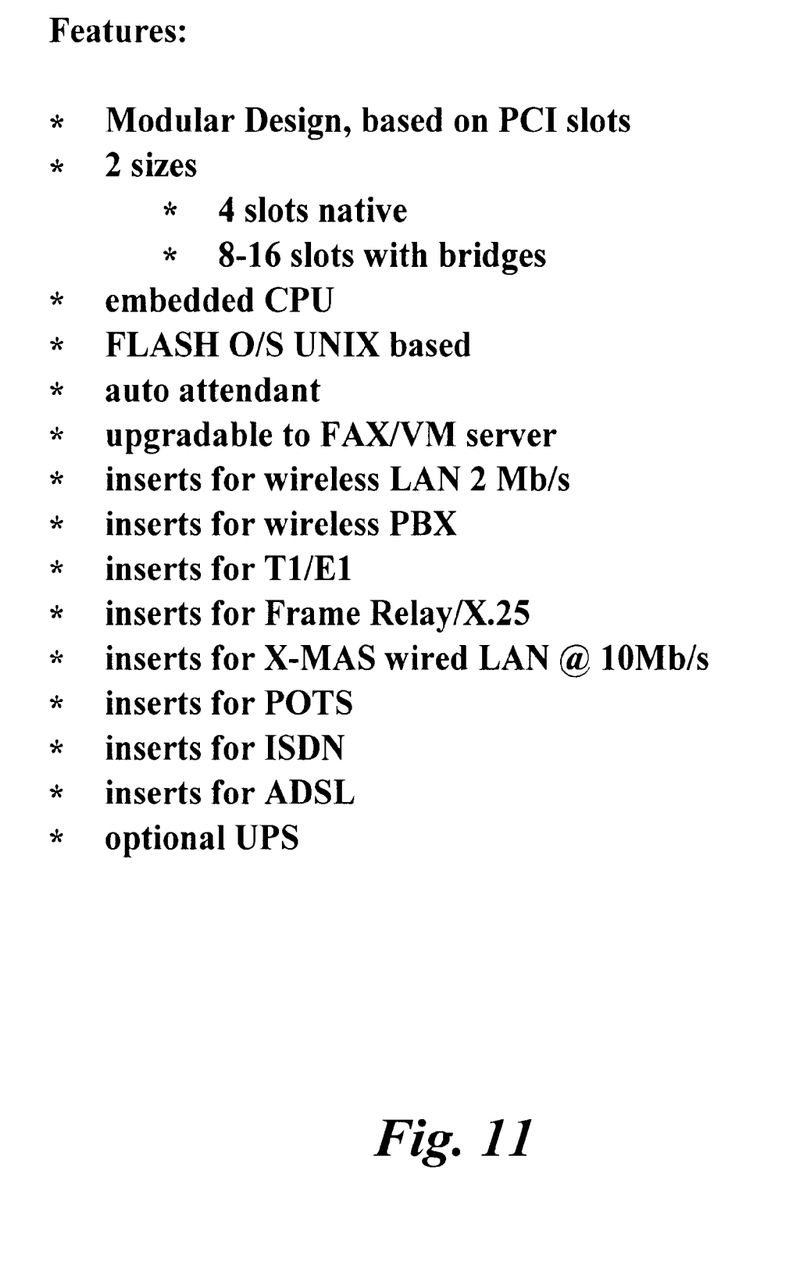
FIG. 11 is a line by line listing of the components for the micro-PBX in an embodiment of the present invention.

FIG. 11 is a line-by-line listing of the typically required features of the micro-PBX of FIG. 3 in an embodiment of the present invention. No further explanation is deemed necessary here as the list of FIG. 11 is self explanatory. Some variation may occur depending on implementation of features and associated software.

It will be apparent to those with skill in the art that there may be many alterations in the embodiments of the invention shown and described without departing from the spirit and scope of the invention. Many variations have been described above, such as an ability to handle any network protocol between various pieces of connected equipment. There are also many variations in the control routines that may be used, and in the hardware provided as Adapter Unit 101.

In the aspect of invention described with reference to FIG. 3, there are similarly many alterations that might be made without departing from the spirit and scope of the invention. Many of these options have already been described above. For example, there is a broad variance in PBX functions that may be utilized by micro-PBX 301. Similarly the data protocol used on the in-house wiring may be varied from embodiment to embodiment, depending on compatibility with the CSMA/CD-type network management provided on the in-house wiring. Design and placement of converter boxes may vary as well, and there are a number of alternatives in the way power for internal components may be supplied. The differences are numerous, and the invention is limited only by the breadth of the claims which follow.

What is claimed is:

1. A home networking system comprising:

conventional telephone wiring connected to telephone jacks in a customer's premises;

a customer demarcation unit at a customer's premise, having a port connected to outside telephone wiring and a port connected to the conventional telephone wiring in the customer's premise, receiving signals on the outside telephone wiring, and driving the conventional telephone wiring in the customer's premises as a local-area network (LAN) using a spread-spectrum high-frequency signal, converting the signals received to the protocol required by the LAN; and a connection unit at a connection point for a customer's device to receive signals on the LAN, the connection unit having a sensor for sensing signal strength on the network, a microprocessor, a stored program executable by the microprocessor, a path from the LAN to a connection to a customer's device, and a delay line;

wherein the microprocessor in the connection unit, sensing a minimum signal strength threshold, switches the delay line into the path to the customer's device, thereby improving signal strength to the customer's device.

\* \* \* \* \*